(12) United States Patent
Goodrich et al.

(10) Patent No.: US 6,888,102 B2
(45) Date of Patent: May 3, 2005

(54) CARPET SEAMING IRON (75) Inventors: Gary Goodrich, Union City, CA (US); Carl Sparks, Fremont, CA (US)

(73) Assignee: Goodrich-Woo Enterprises, Inc., Reno, NV (US)

( * ) Notice: Subject to any disclaimer, the term of this patent is extended or adjusted under 35 U.S.C. 154(b) by 156 days.

(21) Appl. No.: 10/290,379

(22) Filed: Nov. 6, 2002

(65) Prior Publication Data

US 2004/0217107 A1 Nov. 4, 2004

(51) Int. Cl.[7] .................................................. D06F 75/26
(52) U.S. Cl. ......................... 219/252; 219/245; 219/251
(58) Field of Search ................................. 219/252, 251, 219/245, 483–486, 508, 515

(56) References Cited

U.S. PATENT DOCUMENTS

| | | | | |
|---|---|---|---|---|
| 4,829,157 A | * | 5/1989 | Loyd | 219/228 |
| 5,210,394 A | * | 5/1993 | Kerremans | 219/245 |
| 5,252,806 A | * | 10/1993 | Hudson | 219/245 |
| 5,384,001 A | * | 1/1995 | Hoopengardner | 156/391 |
| 5,944,943 A | | 8/1999 | Kwok et al. | |
| 6,172,335 B1 | | 1/2001 | Goodrich | |
| 6,263,596 B1 | * | 7/2001 | Pedron et al. | 38/77.7 |
| 6,421,939 B1 | * | 7/2002 | David et al. | 38/76 |

* cited by examiner

*Primary Examiner*—Robin O. Evans
*Assistant Examiner*—Vinod Patel
(74) *Attorney, Agent, or Firm*—Thomas M. Freiburger (57) ABSTRACT

A carpet seaming iron has two heating elements to maintain the iron at desired temperature with a minimum of temperature oscillation. One element remains energized as long as the iron is switched on, while the other is controlled by a thermostat. With proper selection of the power of the first heating element, the iron achieves a very steady, minimally-oscillating temperature by cycling the second element on and off in response to actual iron temperature during use, supplementing the first element as needed. Larger oscillations such as exhibited with single-element thermostat-controlled irons are avoided by the relatively smaller power of the second element, the only element cycled on and off, even when the thermostat is mechanical.

23 Claims, 10 Drawing Sheets

FIG. 1

PRIOR ART

FIG. 2

PRIOR ART

DUAL ELEMENT SYSTEM WITH
BIMETAL THERMOSTAT

**DUAL HEATER ELEMENT SYSTEM
WITH ELECTRONIC SWITCH**

FIG. 5

**DUAL HEATER ELEMENT SYSTEM
WITH ELECTRONIC TWO STAGE SWITCH**

**DUAL HEATER ELEMENT SYSTEM
WITH ELECTRONIC TWO STAGE SWITCH**

CARPET SEAMING IRON

BACKGROUND OF THE INVENTION

The invention relates to carpet seaming irons for applying carpet seaming tape to join sections of carpet together at the backing. More specifically the invention relates to such a carpet seaming iron with temperature control that achieving minimal temperature oscillation during use of the iron.

Carpet seaming tape for attaching sections of carpet together has been well known for several decades. The tape bears a hot melt adhesive which is laid face up beneath the desired joint of the two carpet backings. When a carpet seaming iron at prescribed temperature is pushed over the adhesive and under the carpet edges, melting the adhesive, the carpet sections are seamed together behind the iron by pushing the backings down into the melted adhesive.

The following U.S. patents are directed to features of carpet seaming tape irons: U.S. Pat. Nos. 5,944,943 and 6,172,335.

Carpet seaming tape irons have electric resistance heating elements, under thermostatic or electronic control. When a mechanical thermostat is used temperature oscillation is large. A typical three inch wide iron will oscillate peak to valley about 40° F. for a good quality iron, up to 70° F. for a poorly constructed iron. A typical six inch iron will oscillate 30° to 40° F.

A part of this oscillation is due to the nature of the bimetal thermostat. A bimetal thermostat of the creeper configuration has an on/off differential, or dead zone, of 11° to 25° F., this type being used on most irons. A bimetal thermostat of the snap action configuration has an on/off differential, or dead zone, of 20° to 35° F.

The remainder of the iron is temperature oscillation is caused by overshoot and undershoot. This is dependent on thermal mass of the sole plate, the heater power, and thermal load (hot melt volume).

Temperature oscillation can cause problems in use, for the iron may sometimes be too cool or too hot for effective or efficient use in seaming carpet. A typical optimum temperature is about 390° F., and a high-powered heating element is used to achieve this level of heat. Higher-powered heating elements, and the thermostats used with them, tend toward higher oscillation.

The above referenced U.S. Pat. No. 6,172,335 is directed at the same problem described above, but presents a different solution.

SUMMARY OF THE INVENTION

The carpet seaming iron of this invention includes two separate heating elements for maintaining the iron at desired temperature with a minimum of temperature oscillation. In a first embodiment a first heating element of about 150 watts power is in continuous operation, while a second heating element, which supplements the first element is under the control of a standard bimetal thermostat. The iron achieves approximately 10° to 15° F. reduction in overall temperature oscillation while in active use seaming carpets (under load conditions, rather than resting on the bench).

A second embodiment of the iron uses electronic control replacing the bimetal thermostat. As is known, this can reduce the inherent differential, or dead zone, to almost zero. As a practical matter, the differential is reduced to about 3° to 5° F., as opposed to the bimetal thermostat numbers mentioned above. The iron of the invention with two separate heating elements and with electronic temperature control can achieve overall temperature oscillation to a range as low as about 10° F. to 20° F. during seaming. This is a great improvement over the prior art, at a lower cost than the solution proposed in U.S. Pat. No. 6,172,335.

It is thus among the objects of the invention to improve the performance of a carpet seaming tape iron by reducing temperature oscillation during use, primarily through the provision of two separate heating elements, a first of which is always energized while the iron is powered, maintaining a certain minimum temperature for the iron's base plate, and a second which is turned on and off by a thermostat or other control in response to supplemental heating needed to keep the iron at the target temperature. These and other objects, advantages and features of the invention will be apparent from the following description of a preferred embodiment, considered along with the drawings.

DESCRIPTION OF PREFERRED EMBODIMENTS

Figure 1:
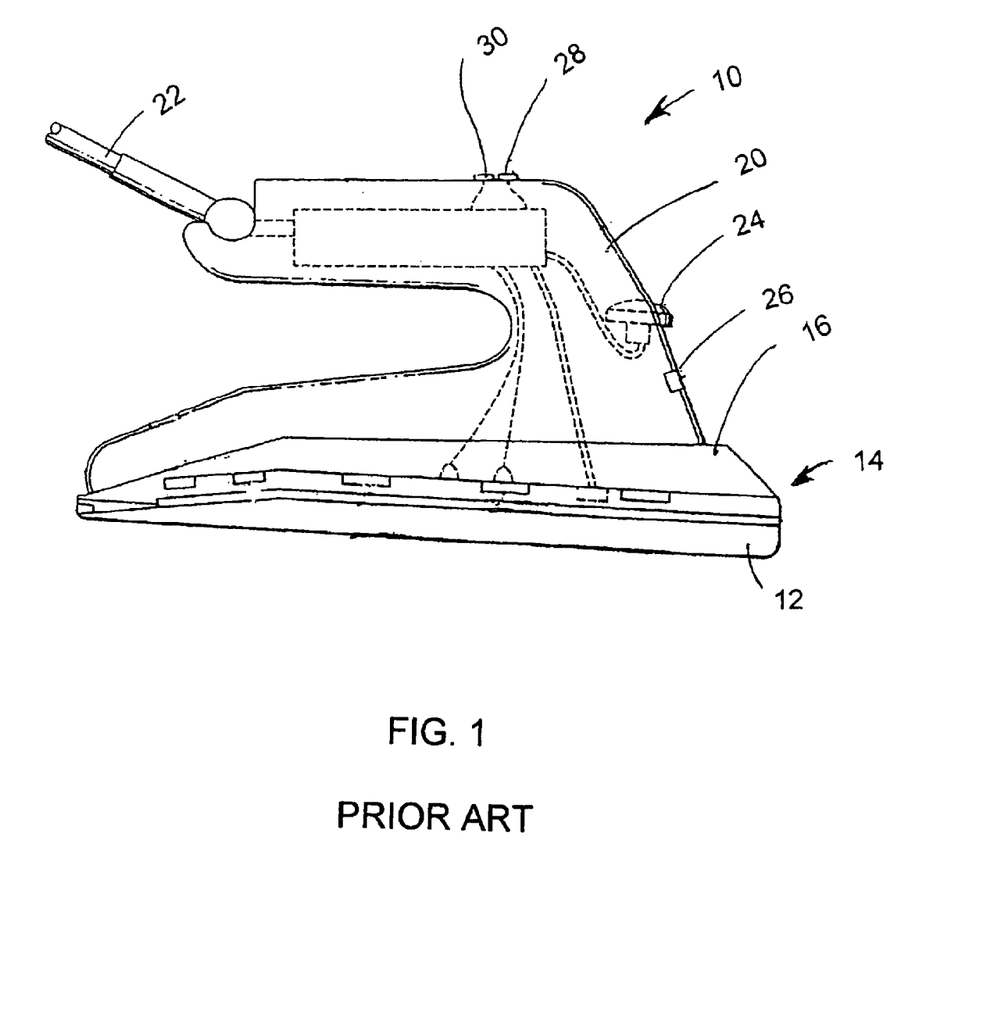
FIG. 1 is a side elevation view showing a typical carpet seaming iron of the type with which this invention is concerned.

In the drawings, FIG. 1 shows a carpet seaming iron 10 of a typical conventional configuration. The iron has a base plate 12 which contacts the hot melt adhesive on the carpet seaming tape, and above the base plate is a housing 14 containing a heating element and some electrical components. Typically an iron of this type will have a heat shield 16 forming the upper side of the housing, and a handle 20 extends up from the housing for gripping by the user. A power cord is shown at 22. Such an iron typically has a temperature adjustment, as indicated by the partially exposed dial wheel 24 seen in FIG. 1. At 26 is shown an indicator light, and a further indicator lamps are shown at 28 and 30.

Figure 2:
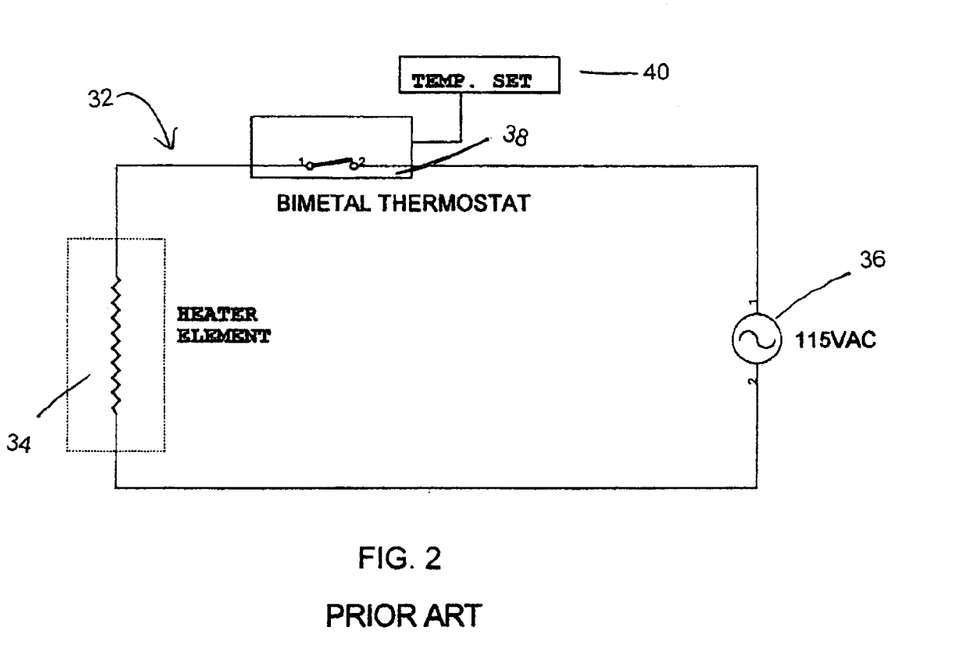
FIG. 2 is a simple schematic showing a heating element in a circuit with a bimetal thermostat, a typical prior art arrangement for a standard seaming iron.

FIG. 2 shows a typical prior art heater circuit for such a carpet seaming tape iron. The circuit 32 is shown with a single heater element 34, connected to power as indicated at 36, power being switched on and off during operation by a bimetal thermostat 38. Typically a mechanical temperature set adjustment 40 is provided, connected to the thermostat, to set a target temperature. As noted above, such a heating circuit with a bimetal thermostat can exhibit temperature oscillation of 40° F. or even up to 70° F. for inexpensive irons.

Figure 3:
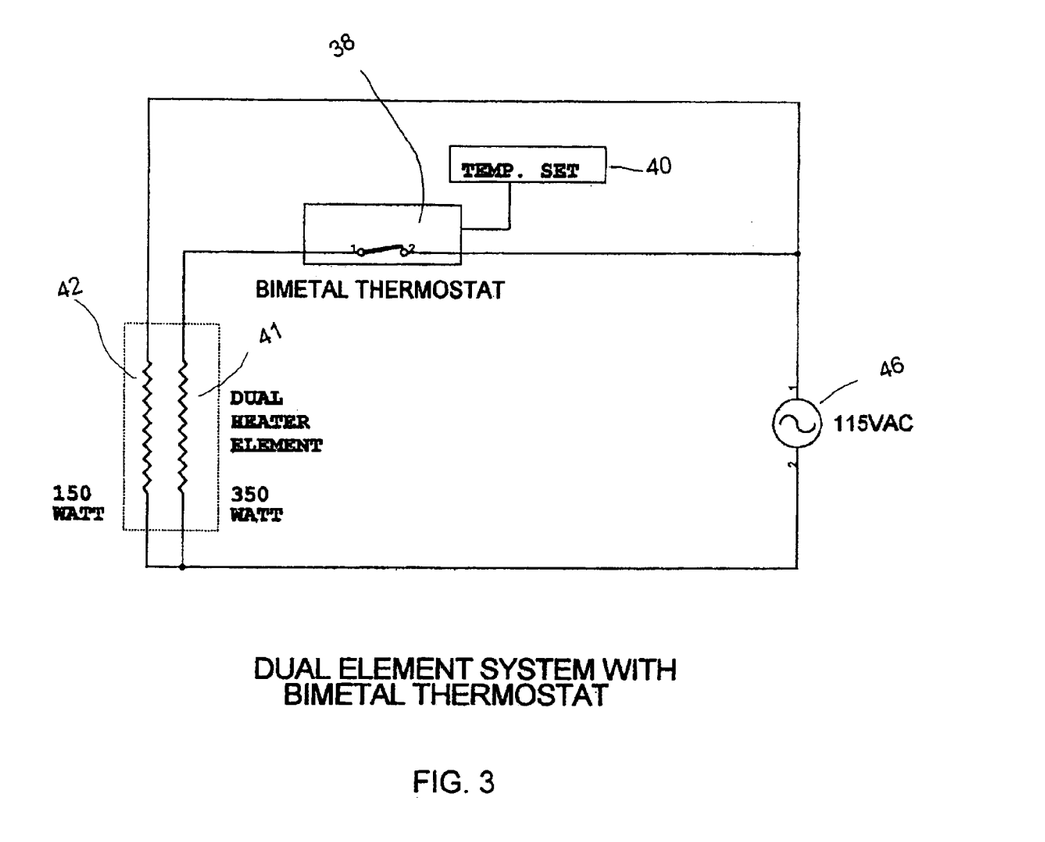
FIG. 3 is a schematic similar to FIG. 2, but showing a two element system according to the invention, as incorporated in the carpet seaming iron.

In FIG. 3 is shown a heater circuit for an iron according to the invention. Two separate electric heating elements 42 and 44 are included in this iron, with the element 42 being constantly powered by 110 VAC as shown at 46. As explained above, the iron of the invention uses the first or primary heating element 42 to maintain the iron at a desired minimum temperature, which will fluctuate with use and non-use of the iron, but which is supplemented by the second heating element 44 as needed. The primary heater element 42 may be, for example, a 150 watt element. In this case, this element alone will maintain the temperature in a base plate of a typical iron, three inches wide, at about 350° F. when the iron is resting on a stand and not in use.

In this embodiment, the secondary heating element 44 is of higher power, and may be about 350 watts. This is found adequate to supplement the constantly-on first element, energizing when needed under the control of a mechanical thermostat, i.e. the bimetal thermostat 38 shown. As in FIG. 2, a manual temperature selecting device or knob may be connected to the bimetal thermostat.

A general on/off switch (not shown) may be included in the circuit if desired.

By having a constant primary heating element always energized in the iron of the invention, and merely supplementing that power as needed, there is inherently less temperature oscillation around the desired set point. Overshoot and undershoot are reduced. In this embodiment the undershoot during use is particularly decreased by the presence of continuous heat being provided.

Figure 4:
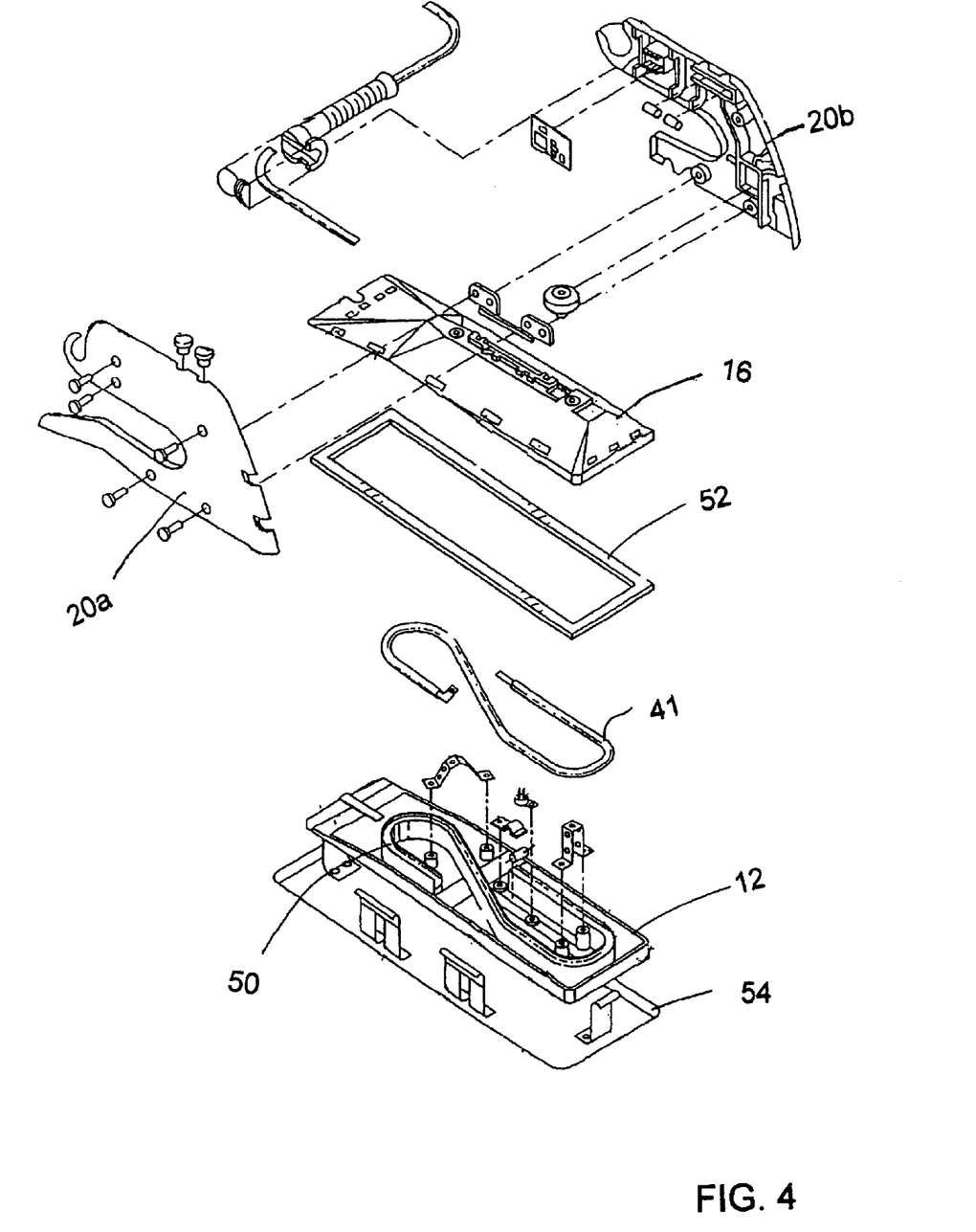
FIG. 4 is a schematic exploded view in perspective showing one possible arrangement for positioning a dual heating element in a housing and in contact with the iron's base plate.

FIG. 4 is a schematic exploded view showing in a simplified manner how two heating elements might be incorporated into an iron, in this case as a dual element appearing the same as a single element. The iron's base plate 12 has a groove 50 deep enough to receive the dual heating element 41.

The remainder of the iron's construction can be similar to typical conventional irons, such as that shown in U.S. Pat. No. 6,172,335. The drawing shows the handle 20 is shown in two sections 20a and 20b, the iron's heat shield 16 is shown above the heating elements, with a gasket 52 to be positioned between the heat shield and the base plate and thus forming the housing 14 of the iron. A tray 54 is shown beneath the base plate, typically used to rest an iron which is turned on but not in use.

Note that the deep groove 50 shown in FIG. 4 for the heating element represents only one of several ways to connect a heating element to a base plate of an iron. When such a deep groove is provided it generally comprises, as shown, upwardly extending metal phalanges deep enough to receive the entire heating element. After inserting the heating element, the metal material of the deep slot or groove then is staked or crimped at its top to hold the heating element in place. Other ways of holding the heating element to a base plate include placing the heating element in a base plate die and casting the metal base plate around the heating element, to capture within; and the provision of a shallower slot in the base, within which the heating element sits partially exposed, with a clamping plate which is somewhat wider than the element bolted down over the element to clamp the heating element in place.

Figure 4A:
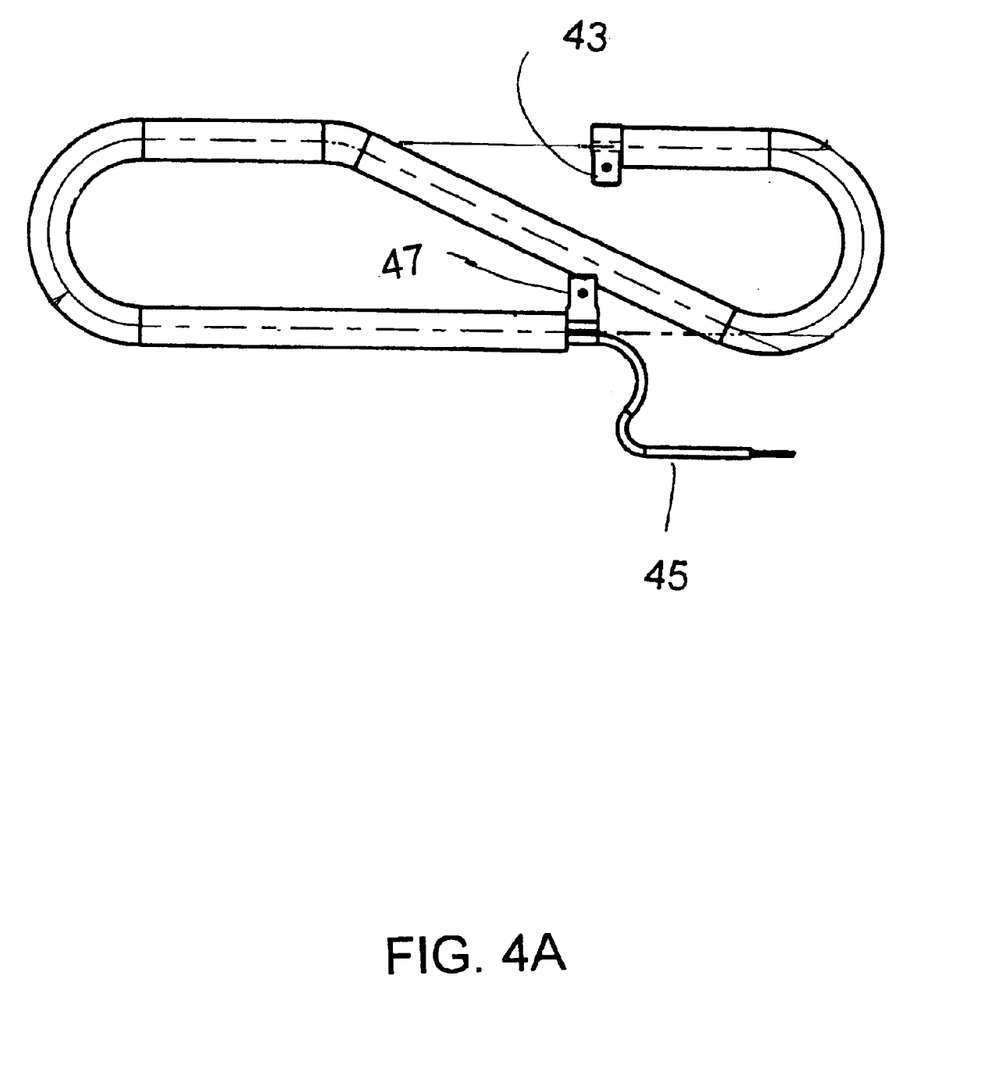
FIG. 4A is a plan view showing a dual element in a single jacket as is preferred.

FIG. 4A shows a dual heating element 41 according to a preferred embodiment. The element 41 has a single terminal 43 at one end, and two separate terminals 45 and 47 at the other end, to enable individual powering of the two circuits. As noted above, the element 41 includes two separate resistance heating elements, covered by a common jacket. Such dual heating elements are available and have been used for other purposes.

Figure 5:
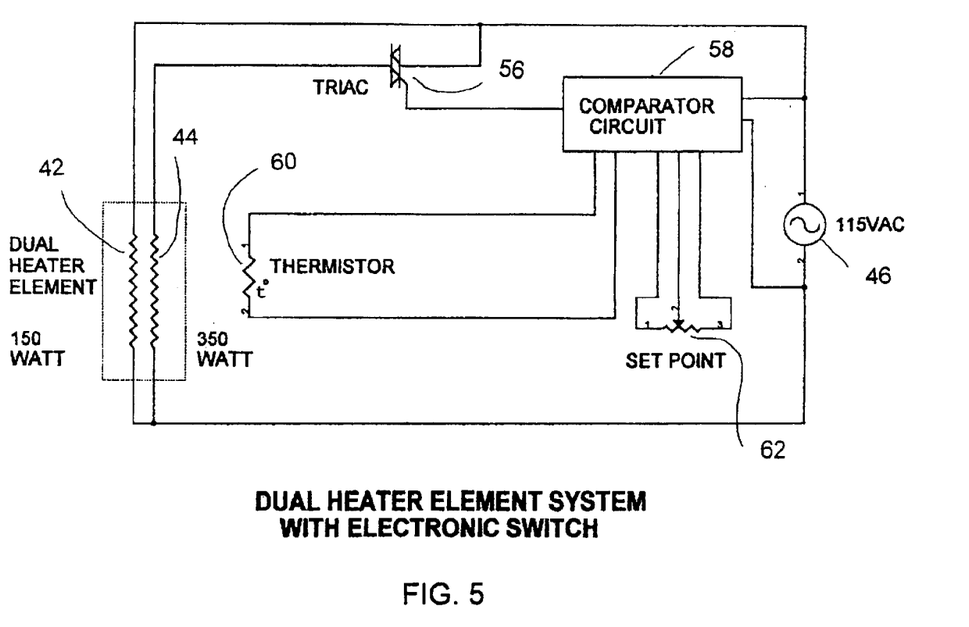
FIG. 5 is a schematic showing a circuit of a multiple heating element system according to the invention, but using an electronic temperature control instead of a bimetal thermostat.

FIG. 5 shows another embodiment of the invention employing two separate heating elements 42 and 44 (which could be the dual element 41 as above), in the form of a circuit diagram, but in this case with electronic control rather than a bimetal thermostat as in FIG. 3. Again, the 110 VAC power 46 is powering the primary heating element 42 as long as the iron is turned "on", indicating this as a 150 watt element, for example. The secondary heating element 44 is controlled by electronics. A triac 56 switches power (110 VAC) to the second element 44 when directed to do so by a comparitor circuit 58. Connected to the comparitor circuit are a thermistor 60, feeding the base plate temperature to the comparitor circuit, and a set point 62, i.e. a temperature selection dial to be used by the operator. The comparitor circuit 58, which can take any of several well known forms, switches power to the second heating element 44 when a comparison between the thermistor temperature and the set point temperature indicates that supplemental heat is needed. Temperature can be maintained very closely, limited only by a narrow "dead zone" for this type of control.

The embodiment shown in FIGS. 3 and 5 can employ the temperature control disclosed in Goodrich U.S. Pat. No. 6,172,335 if desired. In that case the temperature control is applied to the secondary heating element 44 substituted for the simpler comparitor circuit 58 shown in FIG. 5.

It should be understood that the electronic control of FIG. 5 can be applied to the prior art arrangement shown in FIG. 2, resulting in a smaller dead zone and lower temperature oscillation. Although electronic controls replacing bimetal thermostats have been known in other contexts, they have not been applied to carpet seaming tape irons in a simple and straightforward manner as now described. In this embodiment, not shown, the bimetal thermostat of FIG. 2 is replaced by the comparitor circuit 58, thermistor 60 and set point 62 shown in FIG. 5. The comparitor circuit can operate a triac 56 such as shown in FIG. 5, to turn the single heater element 34 of FIG. 2 on and off. Even this is an improvement over the prior art of carpet seaming tape irons, reducing temperature oscillation as noted above.

Figures 6, 6A:
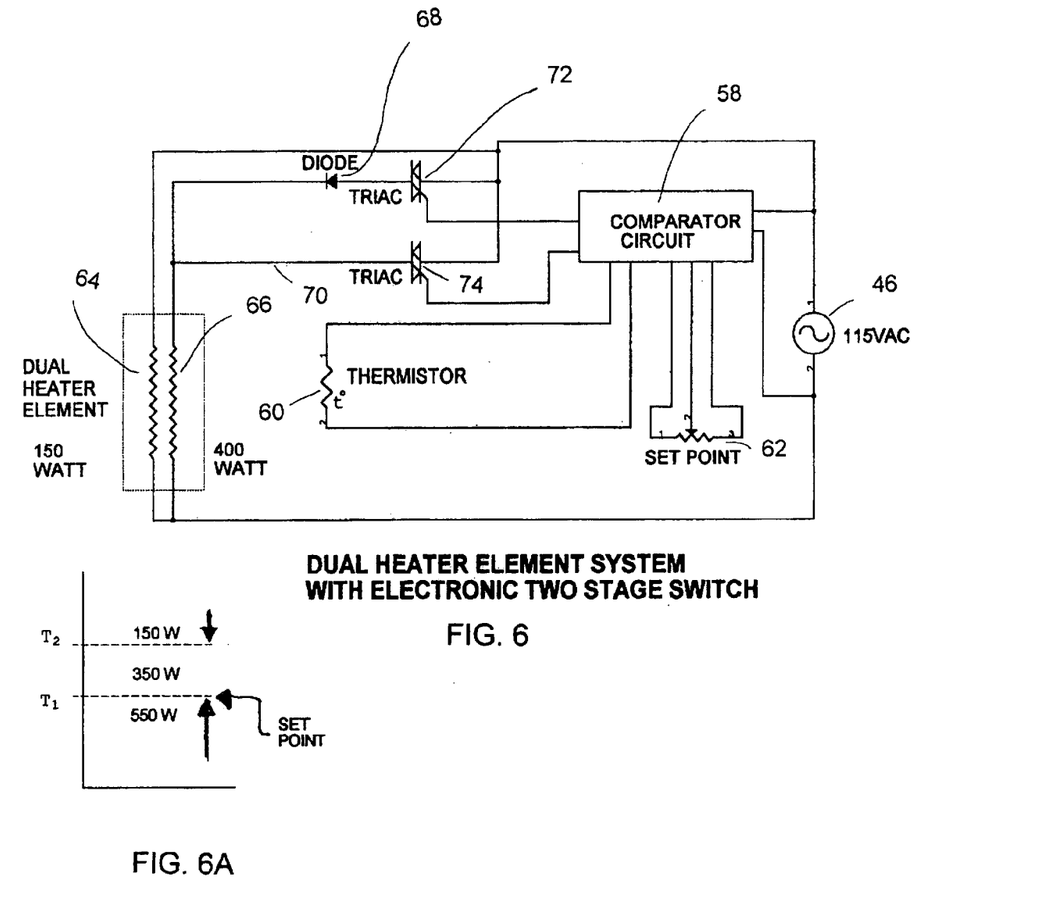
FIG. 6 is another schematic circuit diagram, showing circuitry which splits the second element, allowing three different power levels.
FIG. 6A is a graph schematically showing the use of two heating elements in the embodiment of FIG. 6.

FIG. 6 shows a further embodiment of the invention, in effect using first and second heaters 64 and 66 as three different heating elements. In this case, because the second element 66 can be used in two different ways, at two different power levels, a preferred embodiment of the iron uses a first element 64 of about 150 watts power. The second element 66 can be about 400 watts power. The circuit shown here generally is similar to that of FIG. 5, except the power to the second circuit can be either via a diode 68 or not via a diode, as shown in the parallel line at 70. Again, there is a thermistor 60 and a set point 62, connected to a comparitor circuit 58 generally as in FIG. 5. A pair of triacs 72, 74 switch power to the second element 66 under the direction of the comparitor circuit 58. In this way, if the triac 72 is switched on to provide power through the diode 68, the secondary heating element 66 is powered at only half full power. On the other hand, if the triac 74 is switched on, the heater 66 is powered at full power. Both triacs 72 and 74 are turned off when no supplemental heat is needed.

The advantage of this dual use of the second heating element is that the dynamics of use of the iron, at different rates of advance along the tape and for different tapes, can be matched so as to still maintain consistent temperature. Typical carpet seaming rates vary between 1.5 feet per minute and 3.3 feet per minutes. This represents a large ratio difference in loading. In addition to this ratio the installer moves the iron incrementally along the carpet, giving the iron a stepped loading. This requires variable power and fast response to maintain the iron's sole plate temperature.

All temperature control schemes are for matching the load to the heating power to maintain constant temperature. In this case the seaming rate combined with the hot melt loading of the tape is the load. The more closely matched a heater is to a constant load the less often the controller will turn the heater on and off. If the heater and load are perfectly matched the controller does nothing and is not needed. Generally, in the real world, loads vary.

For the installer using a seaming tape lightly coated with hot melt and seaming at a rate of 1.7 feet per minute, this embodiment provides 150 watts plus 200 watts for a total of 350 watts of heat (one-half of the second element 66). The iron will have 150 watts of continuous power pulsing to 350 watts as needed. The 350 watts of heat more closely matches the low loading of this example.

For the installer using a seaming tape heavily coated with hot melt and seaming at a rate of 3.3 feet per minute, this embodiment provides 350 watts plus 200 watts for a total of 550 watts of heat. The iron will have 350 watts of continuous power pulsing to 550 as needed. The 550 watts of heat more closely matches the high loading of this example.

For the loads that fall between, these examples will utilize all three power levels. By more closely matching the power to the load, the temperature is maintained more consistently. The comparitor circuit recognizes the need for the different power levels, therefore controlling the temperature to a narrower band of oscillations than in the earlier embodiments.

The comparitor circuit looks at the difference in temperature between the thermistor (actual base plate temperature) and the set point, and when this temperature gap increases (e.g. because the installer is moving quickly down the tape), the comparitor turns on more power accordingly.

As one working example, an iron cooling under load will have a minimum of 150 watts of power helping to maintain temperature. Starting at a high temperature for the iron, as it cools it will pass $T_2$ in FIG. 6A and the first triac 72 through the diode 68 will turn on, boosting the power to 350 watts. Should the 350 watts prove insufficient to keep the iron from continuing to cool, when the temperature $T_1$($T_2$−3° in this example) is reached, the second triac 74 turns on. The power is now boosted to 550 watts until the temperature rises above $T_1$. As the temperature rises above $T_1$ the power is reduced to 350 watts. As the temperature rises above $T_2$, the power is again cut to 150 watts. This is a simplified description with the "dead zone" equal to zero and 3° being an arbitrary value.

FIG. 6A indicates in simple terms the three different power levels which can be used according to the circuit of FIG. 6. As noted, the different levels are 150 watts, 350 watts (heater element 64 plus half power of heating element 66), and 550 watts (full power both heating elements). The graph of FIG. 6A also shows temperature levels $T_2$ and $T_1$, and this indicates that as the iron is taken up and used from an idle position, the temperature will drop below $T_2$ and the power level will be raised by the comparitor up to 350 watts. If the installer then puts a heavier load on the iron, dropping below temperature $T_1$, full power will be turned on by the comparitor circuit, as explained in the example above.

Figures 7, 7A:
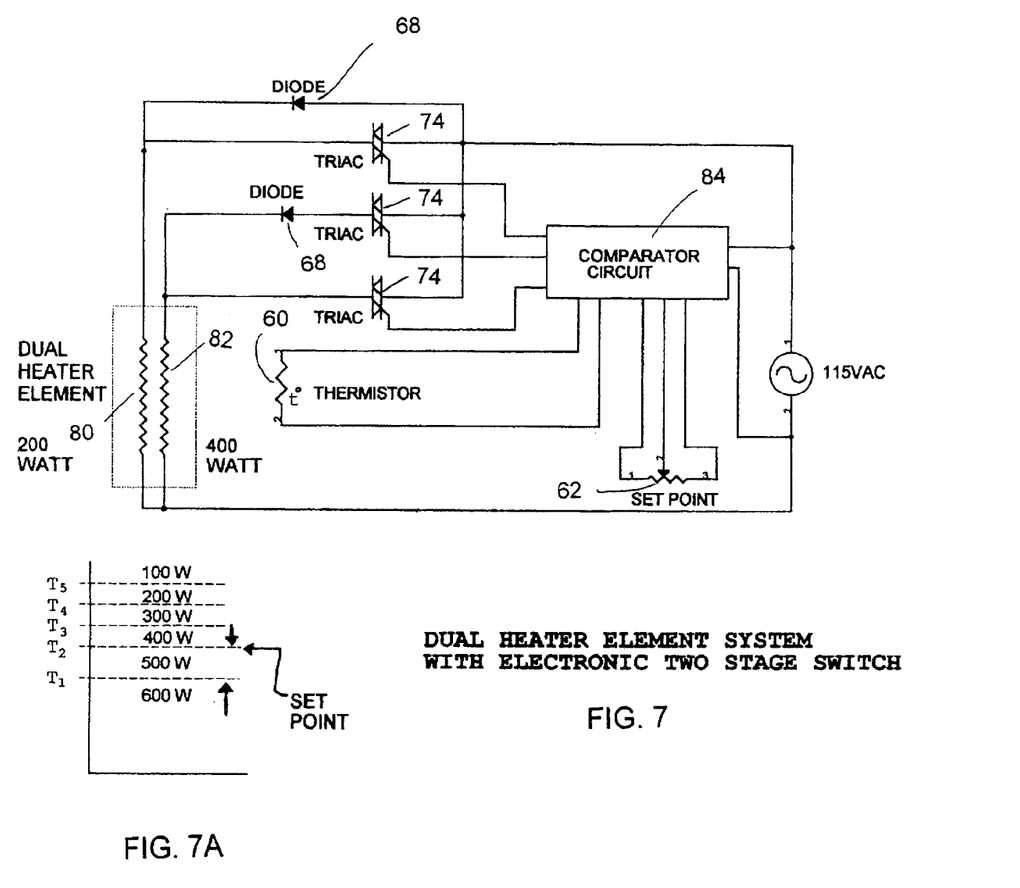
FIG. 7 is a further schematic circuit drawing, somewhat similar to FIG. 6, and showing both heating elements being split to allow numerous different power levels.
FIG. 7A is a graph schematically showing the use of two heating elements for multiple selectable power levels as in FIG. 7.

FIG. 7 is a schematic circuit diagram showing a further embodiment of the invention. This is similar to what is shown in FIG. 6, except that here, both heater elements 80 and 82 are used at two different levels, half power or full power. As noted, a diode 68 is included in each circuit, and power can be directed through this diode to cut power to half level when needed, or the diode can be shunted out (or made redundant) to operate the heating element at full power. This is true for both heating elements 80 and 82. A logic circuit shown at 84 controls the application of power to each of the heating elements, after receiving inputs from the thermistor 60 and the set point 62. Triacs 74 can be used for switching this function. The first circuit diode 68 need not be switched, because the first element 80 is always minimally powered; however, the second element 82 is capable of complete shutoff.

The advantage of this embodiment is the number of combinations that can be used with the two heating elements, at half power or full power. The two heating elements are shown in this exemplary embodiment at 200 watts and 400 watts. The logic circuit can make decisions as to how to power these two elements by its inputs from the thermistor and set point and the detected difference, as described above. This affords a more finely-tuned power-to-load match.

FIG. 7A shows various different temperature levels, and the different power levels which can be applied, 100 w, 200 w, 300 w, 400 w, 500 w and 600 w. Higher power levels are brought in as needed, as explained above relative to FIGS. 6 and 6A.

Figure 8:
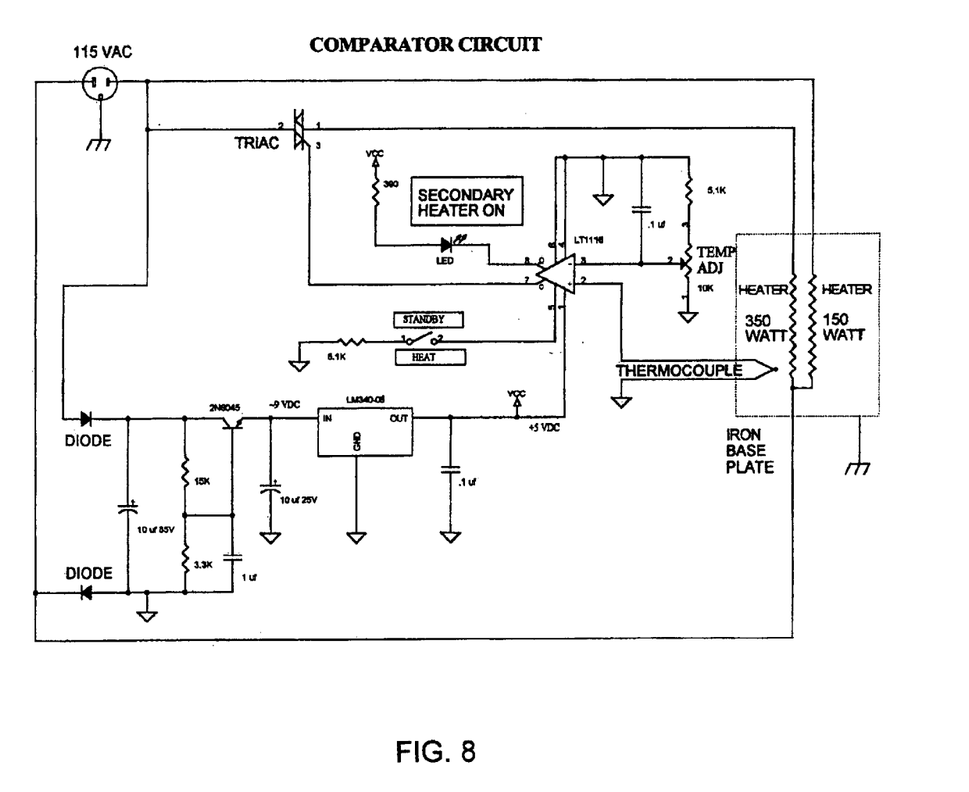
FIG. 8 is another schematic circuit diagram, showing details in one embodiment, for the simple schematic shown in FIG. 5.

FIG. 8 is an example of a more detailed circuit diagram for the embodiment shown in FIG. 5. This is one example of how the circuit and its functions may be carried out.

The above discussion of preferred embodiments, and particularly in relation to the heating element power capacities, is primarily for a three inch wide carpet seaming iron. However, the embodiments also apply to a six inch wide carpet seaming iron, in which case the preferred values for the heating elements will be larger. For the two element embodiment of FIG. 5, for example, the primary and secondary heating elements should be at about 300 watts and 700 watts, respectively, for a total maximum power of 1000 watts. The embodiments of FIGS. 6 and 7 will vary accordingly.

Figure 9:
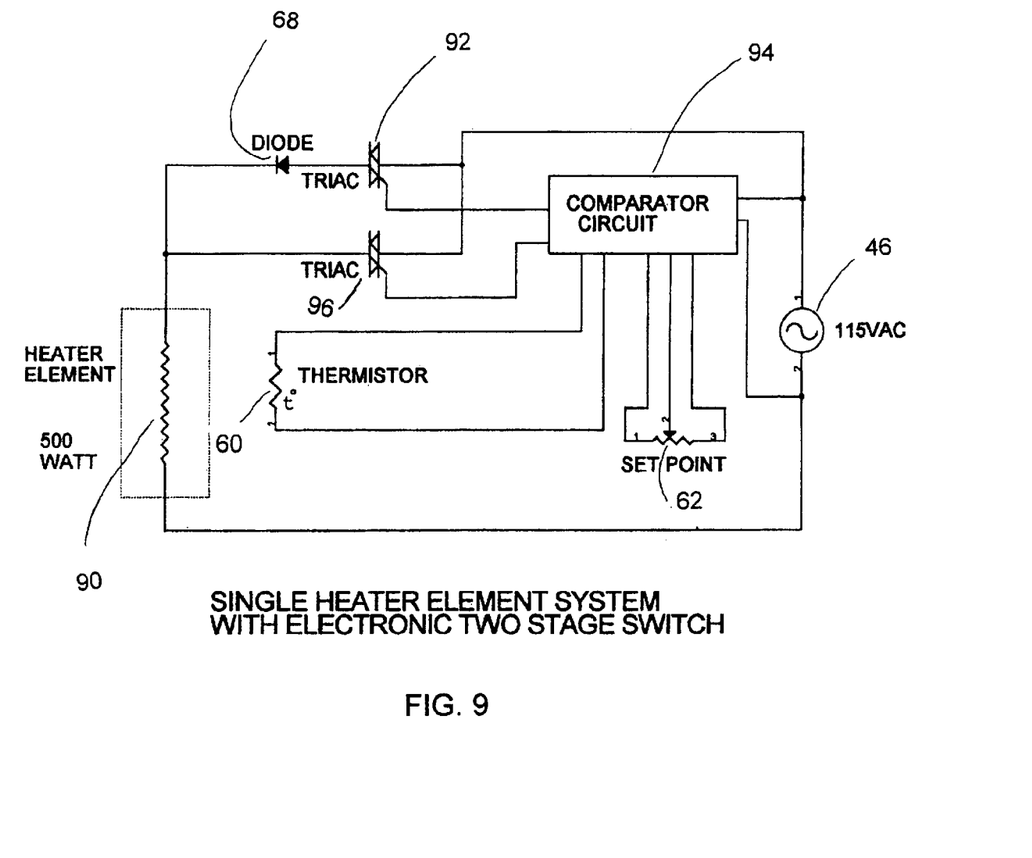
FIG. 9 is a schematic circuit diagram showing another form of the invention, essentially FIG. 6 with a single heating element.

FIG. 9 shows a variation of the circuit shown in FIG. 6. In the carpet seaming iron and circuit represented in FIG. 9, only a single heater element 90 is included, and this may be approximately 500 watts. However, even with this single element, some of the advantages of the invention are still realized. This is because the single element 100 is operated in essentially the same manner that the second element 66 is operated in the embodiment of FIG. 6. A diode 68 in the circuit divides power in half, so that when the illustrated triac 92 is switched on by the comparitor circuit 94, with a second triac 96 switched off, the heating element consumes 250 watts of power. The triac 92 is generally needed, in a three inch iron, because 250 watts is too much power for the idle position of the iron; thus the triac 92 will be cycled off and on, to switch off and on the 250 watts of power, when the iron is at idle. When, in the circumstances as described above, the iron is in use such that more than 250 watts power are needed to maintain desired temperature, the comparitor circuit switches on the second triac 96, which puts the 500 watt heater element 90 at full power. Thus, in this embodiment some of the above described advantages are realized because a single heater element is operated, in effect, in the manner of two separate heater elements. Therefore, power can be more closely matched to load, such that temperature oscillation is reduced as compared to a single heating element iron which as only a simple on and off cycle.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. An electric carpet seaming tape iron, comprising:
   a base plate,
   a housing secured to the base plate and having a handle,
   a first heating element secured to the base plate and contained in the housing,
   a second heating element secured to the base plate and contained in the housing,
   a power cord supplying electric power to the iron and connected into the housing,
   a first circuit connected to power from the power cord and connecting power to the first heating element at all times when the iron is in an "on" condition for use, and
   a second circuit connected to power from the power cord and including a temperature control means for cycling the second heating element on and off in response to sensed temperature of the iron's base plate, as needed to maintain a desired range of temperature of the base plate during the iron's "on" condition.

2. The apparatus of claim 1, wherein the temperature control means comprises a mechanical thermostat in the second circuit.

3. The apparatus of claim 1, wherein the temperature control means comprises a non-mechanical temperature control in the second circuit.

4. The apparatus of claim 1, wherein the first heating element has a power draw of approximately 150 watts.

5. The apparatus of claim 4, wherein the second heating element has a power draw of approximately 350 watts.

6. The apparatus of claim 1, wherein the first heating element is of power draw sufficient to hold the iron's base plate at a temperature of about 300° F. to 390° F. when the iron is "on" but not being used.

7. The apparatus of claim 1, wherein the temperature control means comprises a mechanical thermostat, and wherein the iron exhibits a temperature oscillation of less than 40° F. in use.

8. The apparatus of claim 1, wherein the first and second heating elements are contained within a single heating element jacket.

9. The apparatus of claim 1, wherein the second circuit includes a diode and switching means for powering the second heating element selectively at zero power, one-half power or full power as needed to maintain desired temperature, thereby providing additional power combinations from the first and second heating elements.

10. The apparatus of claim 10, wherein the first circuit also includes a diode and first circuit switching means, for maintaining the first heating element at least at one-half power at all times when the iron is in the "on" condition and for selectively powering the first heating element at full power, whereby further combinations of power settings of the first and second heating elements are possible, permitting smaller increments of power levels to the heating elements.

11. The apparatus of claim 10, wherein the first heating element has a power capacity of 150 watts, and the second heating element has a power capacity of 400 watts.

12. The apparatus of claim 1, wherein the iron is about three inches in width.

13. The apparatus of claim 1, wherein the iron is about six inches in width.

14. An electric carpet seaming tape iron, comprising:
    a base plate,
    a housing secured to the base plate and having a handle,
    a first heating element secured to the base plate and contained in the housing,
    a second heating element secured to the base plate and contained in the housing,
    a power cord supplying electric power to the iron and connected into the housing,
    a first circuit connected to power from the power cord and connecting power at a base level to the first heating element at all times when the iron is in an "on" condition for use,
    a second circuit connected to power from the power cord and including a diode and second circuit switching means providing for powering the second heating element at either zero power, one-half power or full power, and
    temperature control means connected to the second circuit switching means, for cycling the second heating element on and off, at one-half power or full power, in response to sensed temperature of the iron's base plate, as needed to maintain in combination with the first heating element a desired range of temperature of the base plate during the iron's "on" condition.

15. The apparatus of claim 15, wherein the first circuit also includes a diode and first circuit switching means, for maintaining the first heating element at least at one-half power at all times when the iron is in the "on" condition and for selectively powering the first heating element at full power, whereby further combinations of power settings of the first and second heating elements are possible, permitting smaller increments of power levels to the heating elements.

16. The apparatus of claim 16, wherein the first heating element has a power capacity of 200 watts, and the second heating element has a power capacity of 400 watts.

17. The apparatus of claim 15, wherein the first heating element has a power capacity of 150 watts, and the second heating element has a power capacity of 400 watts.

18. The apparatus of claim 15, wherein the first and second heating elements are contained within a single heating element jacket.

19. The apparatus of claim 15, wherein the iron is about three inches in width.

20. The apparatus of claim 15, wherein the iron is about six inches in width.

21. An electric carpet seaming tape iron, comprising:

a base plate, a housing secured to the base plate and having a handle, a heating element secured to the base plate and contained in the housing, a power cord supplying electric power to the iron and connected to the housing, a circuit connected to power from the power cord and including a diode and circuit switching means providing for powering the heating element at one-half power or full power, and temperature control means connected to the circuit switching means, for cycling the heating element on at half power or full power, in response to sensed temperature of the iron's base plate, as needed to maintain a desired range of temperature of the base plate during the iron's "on" condition.

22. The apparatus of claim 22, wherein the temperature control means includes means for switching off all power to the heater element, so that to maintain a desired minimum temperature when the iron is idle, one-half power to the heater element can be cycled on and off as needed, and during active use of the iron, power to the heating element can be switched between one-half power and full power.

23. The apparatus of claim 1, wherein the second circuit includes switching means for powering the second heating element selectively at zero power, one-half power or full power as needed to maintain desired temperature, thereby providing additional power combinations from the first and second heating elements.

* * * * *

UNITED STATES PATENT AND TRADEMARK OFFICE
CERTIFICATE OF CORRECTION

PATENT NO. : 6,888,102 B2
DATED : May 3, 2005
INVENTOR(S) : Goodrich et al.

It is certified that error appears in the above-identified patent and that said Letters Patent is hereby corrected as shown below:

Column 8,
Lines 3 and 12, "claim 10" should read -- claim 9 --.
Lines 46, 58, 61, 64 and 66, "claim 15" should read -- claim 14 --.
Line 55, "claim 16" should read -- claim 15 --.

Column 10,
Line 3, "claim 22" should read -- claim 21 --.

Signed and Sealed this

Twelfth Day of July, 2005

JON W. DUDAS
*Director of the United States Patent and Trademark Office*